(12) United States Patent
Mochizuki et al.

(10) Patent No.: US 9,104,351 B2
(45) Date of Patent: Aug. 11, 2015

(54) NON-TRANSITORY PRINTING CONTROL PROGRAM PRODUCT, PRINTING CONTROL APPARATUS, AND PRINTING SYSTEM

(75) Inventors: Toshihiro Mochizuki, Tokyo (JP); Daigo Miyaguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 102 days.

(21) Appl. No.: 13/493,156

(22) Filed: Jun. 11, 2012

(65) Prior Publication Data
US 2012/0320420 A1 Dec. 20, 2012

(30) Foreign Application Priority Data
Jun. 16, 2011 (JP) .................................. 2011-134046

(51) Int. Cl.
*G06F 3/12* (2006.01)

(52) U.S. Cl.
CPC ............ *G06F 3/1208* (2013.01); *G06F 3/1256* (2013.01); *G06F 3/1285* (2013.01)

(58) Field of Classification Search
USPC .............................................. 358/1.13–1.16
See application file for complete search history.

(56) References Cited

U.S. PATENT DOCUMENTS

| | | | | |
|---|---|---|---|---|
| 7,102,765 | B1 * | 9/2006 | Abi-Saleh et al. | 358/1.13 |
| 2002/0063881 | A1 * | 5/2002 | Nakata et al. | 358/1.14 |
| 2006/0165421 | A1 * | 7/2006 | Yamazaki | 399/9 |
| 2010/0238512 | A1 * | 9/2010 | Kimura | 358/3.24 |
| 2011/0026042 | A1 * | 2/2011 | Cogan et al. | 358/1.2 |

FOREIGN PATENT DOCUMENTS

| | | |
|---|---|---|
| JP | 2005-234812 A | 9/2005 |
| JP | 2007-028105 A | 2/2007 |
| JP | 4370125 B2 | 11/2009 |

OTHER PUBLICATIONS

English language abstract for JP-2005-022343 (which corresponds to JP-4370125-B2).

* cited by examiner

*Primary Examiner* — Marivelisse Santiago Cordero
*Assistant Examiner* — Kevin Ky
(74) *Attorney, Agent, or Firm* — Harness, Dickey & Pierce, P.L.C.

(57) ABSTRACT

A non-transitory printing control program product is disclosed. The printing control program product causes a computer to function as a printing data generating unit which generates printing data for normal printing and printing data for trial printing such that the printing data for the normal printing and the printing data for the trial printing are printed by the same printing apparatus, the printing data for the normal printing and the printing data for the trial printing being generated from the same submitted manuscript data; and a printing data management unit which receives the printing data for the normal printing and the printing data for the trial printing and which causes the same printing apparatus to print the printing data for the normal printing and the printing data for the trial printing in accordance with the normal printing condition and the trial printing condition.

10 Claims, 7 Drawing Sheets

NON-TRANSITORY PRINTING CONTROL PROGRAM PRODUCT, PRINTING CONTROL APPARATUS, AND PRINTING SYSTEM

TECHNICAL FIELD

The present invention relates to non-transitory printing control program products, printing control apparatuses, and printing systems.

BACKGROUND ART

In recent years, printing control program products and printing apparatuses often have implemented therein a function of trial printing or sample printing (below called simply a trial printing function). The trial printing function often refers, for example, to printing using plain paper, without using special paper; or to printing one set in advance for printing multiple sets (see Patent documents 1 and 2, for example).

In recent years, the printing apparatuses have been supporting various post-processing functions, so that even those apparatuses which can perform processes from supplying paper to bookbinding, for example, have appeared. Moreover, in the commercial printing industry, a POD (Printing On Demand) operation which supplies a relatively small lot of printed matter to a customer in a short lead time has appeared. For the POD operation, orders are often received from multiple customers simultaneously.

Moreover, in the POD operation, a printing system including one printing control apparatus and multiple printing apparatuses is used, for example. These printing apparatuses included in such a printing system differ in capabilities such as post-processing functions (for example, stapling and punching), monochrome or color printing, and a sheet size for a paper-supplying tray.

For example, in order to suppress cost in the POD operation, trial printing, in which one set of printed matter is printed using plain paper and not using special paper, is utilized. Now, as the nature of the trial printing is such that it is performed in order to prevent printing from failing, it is desirable that the trial printing is processed by the same printing apparatus as normal printing.

In the printing system including one printing control apparatus and multiple printing apparatuses, when orders from multiple customers are received simultaneously, multiple trial printing and normal printing requests are apportioned to the printing apparatuses by the printing control apparatus based on capabilities demanded for the printing apparatus.

However, capabilities demanded for the printing apparatus differ between the trial printing and the normal printing. Therefore, there is a problem that the printing control apparatus causes processes to be performed such that the trial printing and the normal printing are apportioned to different printing apparatuses for printing.

Patent Documents
Patent Document 1: JP2005-234812A
Patent Document 2: JP2007-28105A

DISCLOSURE OF THE INVENTION

In light of the problems as described above, an object of the present invention is to provide a non-transitory printing control program product, a printing control apparatus, and a printing system that make it possible to cause processes to be performed such that trial printing and normal printing are apportioned to the same printing apparatus.

The present invention may also take a form such that elements, representations, or arbitrary combinations of the elements of the present invention are applied to a method, an apparatus, a system, a non-transitory computer program product, a recording medium, or data structure.

According to an embodiment of the present invention, a non-transitory printing control program product is provided, which non-transitory printing control program product causes a computer to function as a printing data generating unit which generates printing data for normal printing and printing data for trial printing such that the printing data for the normal printing and the printing data for the trial printing are printed by the same printing apparatus, the printing data for the normal printing and the printing data for the trial printing being generated from the same submitted manuscript data, the printing data for the normal printing having set a normal printing condition and the printing data for the trial printing having set a trial printing condition; and a printing data management unit which receives the printing data for the normal printing and the printing data for the trial printing and which causes the same printing apparatus to print the printing data for the normal printing and the printing data for the trial printing in accordance with the normal printing condition and the trial printing condition.

According to the present invention, a non-transitory printing control program product, a printing control apparatus, and a printing system may be provided that make it possible to cause processes to be performed such that trial printing and normal printing are apportioned to the same printing apparatus.

BRIEF DESCRIPTION OF THE DRAWINGS

Other objects, features, and advantages of the present invention will become more apparent from the following detailed descriptions when read in conjunction with the accompanying drawings, in which.

BEST MODE FOR CARRYING OUT THE INVENTION

Next, modes for carrying out the invention are described based on the following embodiments with reference to the drawings.

(Flow of the Overall POD Operation)

Figure 1:
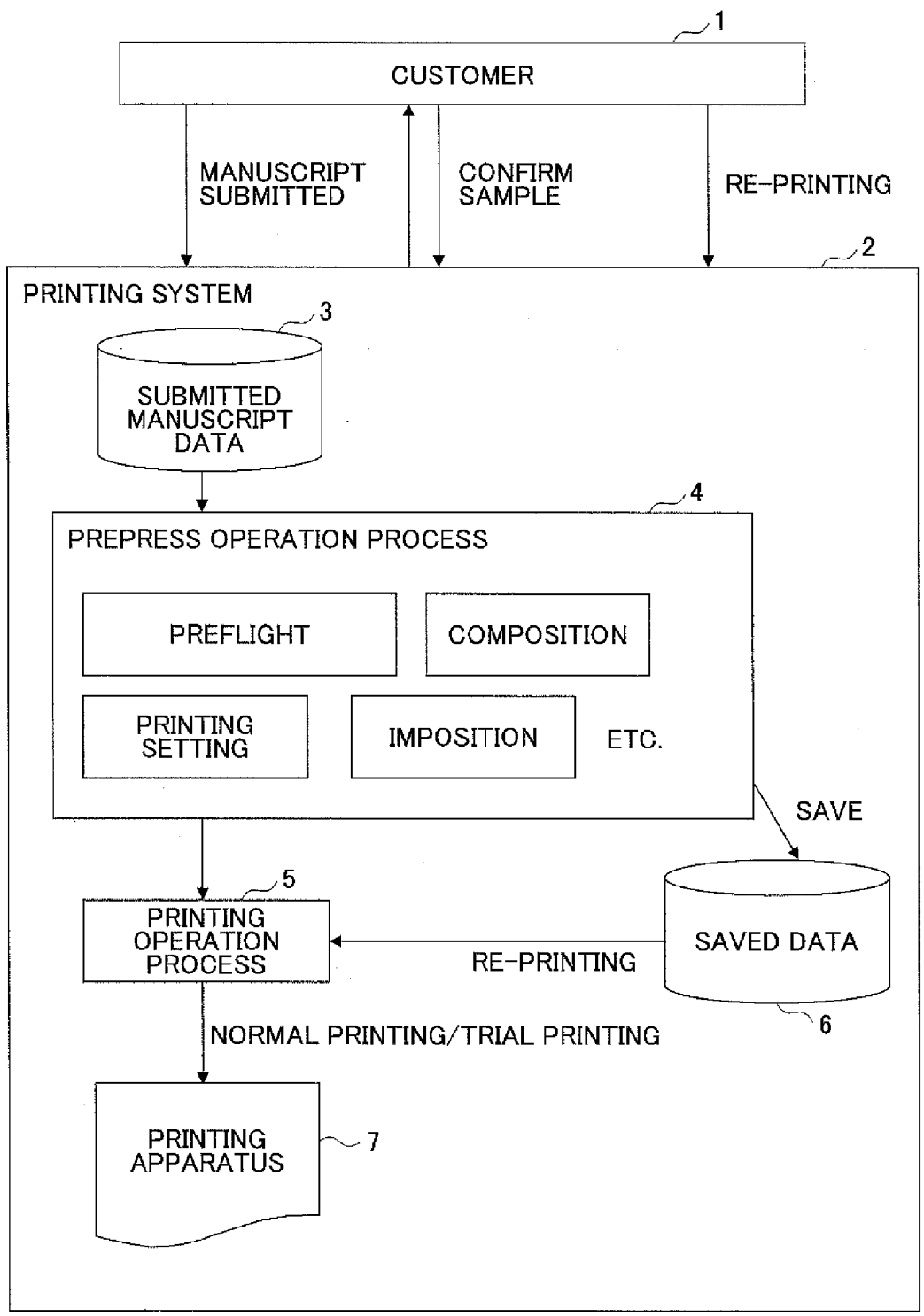
FIG. 1 is a diagram for explaining an example showing a flow of the overall POD operation.

FIG. 1 is a diagram for explaining an example showing a flow of the overall POD operation. In FIG. 1, a customer 1 is a party who obtains a final printing deliverable. The customer 1 submits a printing manuscript to a printing system 2 of a printing vendor. There are various forms of submitting the printing manuscript, including electronic manuscript submission using a network such as the Internet; an electronic manuscript submission using a recording medium such as a flexible disk (FD), an opto-magnetic disk (MO), etc.

The printing vendor carries out a prepress operation process 4 on submitted manuscript data 3 for a printing manuscript. For electronic manuscript submission, the prepress operation process 4 is preflight, an inspection on whether the submitted manuscript data 3 are data which may be printed correctly, etc. Moreover, for a paper manuscript submission, for example, the prepress operation process 4 includes tasks such as correcting images of scanned data and adding page and chapter numbers.

Moreover, the prepress operation process 4 includes imposition and printing setting such as selecting printing sheets and composition. In this way, various operations are required in the prepress operation process 4. Confirming the validity of the prepress operation processing is one of factors for a printing vendor to perform the trial printing frequently.

Moreover, in the POD operation, a sample confirmation by the customer 1 may also be performed. In the sample confirmation, only one or several sets of what is the same as the printing deliverable is printed in advance for the customer 1 to confirm. In the POD operation, when there is a large number of sets to be printed, a large amount of losses may occur for the printing vendor when a re-printing becomes required due to an error of the prepress operation process 4.

Therefore, in the POD operation, an operation of printing after obtaining an approval of the customer through the sample confirmation is often performed. Also for obtaining a printing deliverable for the sample confirmation, a trial printing function becomes important. Whether the sample confirmation is performed is generally determined by a contract with the customer 1.

A printing operation process 5 causes a printing apparatus 7 to execute a printing process with a printing instruction for normal printing or trial printing. Moreover, in the POD operation, re-printing may also be contracted with the customer. There is also a method of carrying out the prepress operation process 4 again from the submitted manuscript data 3 at the time of re-printing.

However, normally it is common to carry out saving as saved data 6, including results of the prepress operation process 4. When the saved data 6 are saved, the printing vendor needs to obtain only the re-printing instruction from the customer, so that often the sample confirmation, etc., are not necessary. When the saved data 6 are saved, it suffices, for the trial printing carried out by the printing vendor, that taking the wrong saved data 6 is prevented, so that what is carried out therein largely differs from what is carried out in the trial printing for the sample confirmation.

(Overall Configuration of Printing System)

Figure 2:
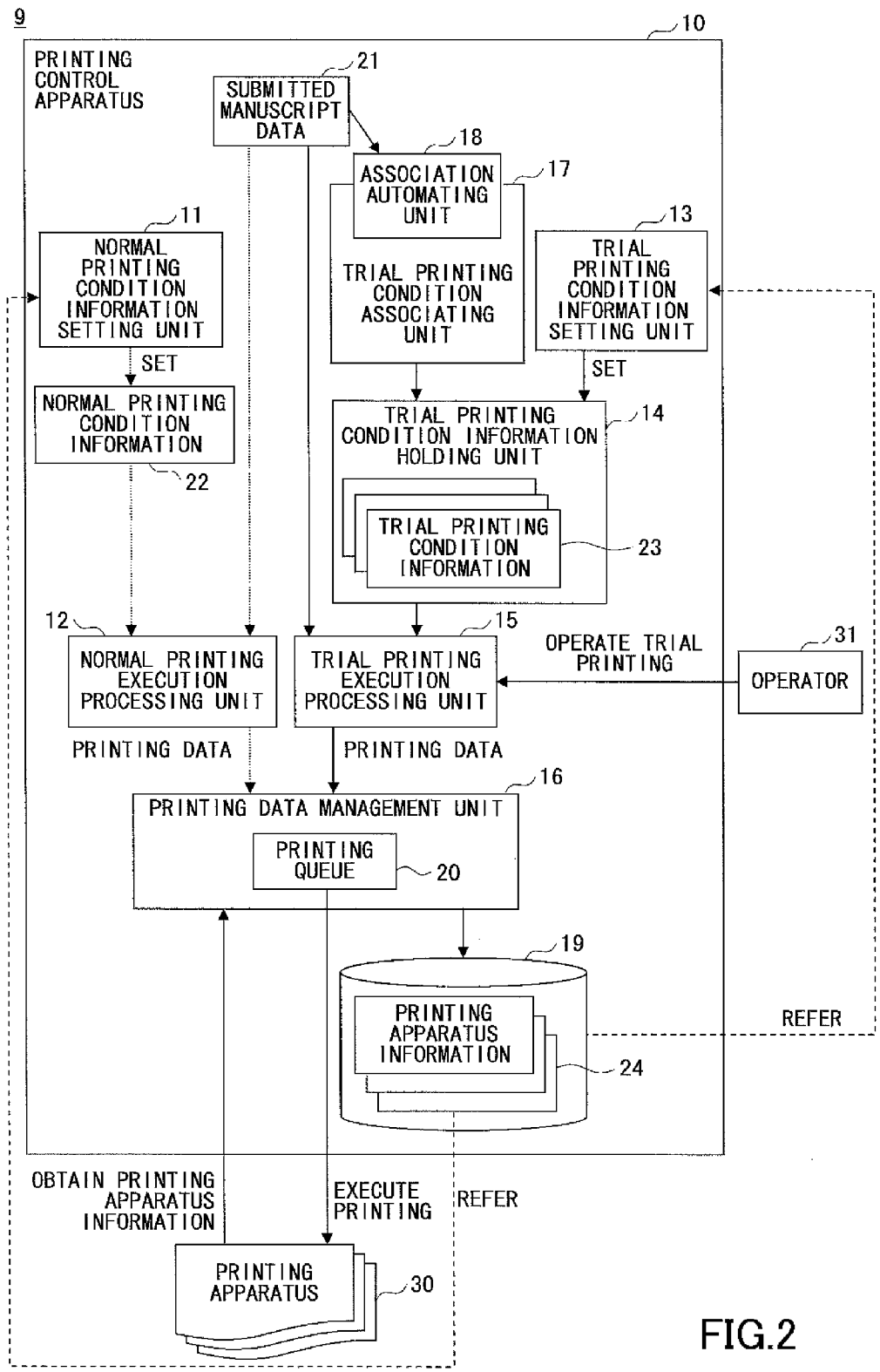
FIG. 2 is a configuration diagram of an example of a printing system according to the present embodiment.

FIG. 2 is a configuration diagram of an example of a printing system according to the present embodiment. In a printing system 9 in FIG. 2, a printing control apparatus 10 and printing apparatuses 30 are connected by a network such as a LAN (local area network), etc. The printing system 9 may include a post-processing apparatus such as a stapling apparatus, a cutting machine, etc. The printing control apparatus 10 includes a normal printing condition information setting unit 11; a normal printing execution processing unit 12; a trial printing condition information setting unit 13; a trial printing condition information holding unit 14; a trial printing execution processing unit 15; a printing data management unit 16; a trial printing condition associating unit 17, and a printing apparatus information holding unit 19. Moreover, the printing data management unit 16 includes a printing queue 20. The trial printing condition associating unit 17 includes an association automating unit 18.

For example, processes performed by the normal printing condition information setting unit 11 and the trial printing condition information setting unit 13 correspond to the prepress operation process in FIG. 1. Processes performed by the normal printing executing unit 12 and the trial printing condition information holding unit 14 correspond to the printing operation process 5 in FIG. 1.

The printing data management unit 16 obtains capabilities information such as post-processing functions including monochrome/color printing, stapling, punching, sheet size of a paper-supplying tray from the respective printing apparatuses 30, and causes the printing apparatus information holding unit 19 to hold the same as printing apparatus information 24 for the respective printing apparatuses 30.

The normal printing condition information setting unit 11 refers to the printing apparatus information 24 to set the normal printing condition information 22. At the time of normal printing, the normal printing execution processing unit 12 receives the submitted manuscript data 21 and the normal printing condition information 22, and, according to a normal printing operation of the operator 31, printing data (below-described printing data A2) generated from the submitted manuscript data 21 and the normal printing condition information 22 are transmitted to the printing data management unit 16.

The trial printing condition information setting unit 13 refers to the printing apparatus information 24 to set trial printing condition information 23. The trial printing condition information holding unit 14 holds the trial printing condition information 23. Moreover, at the time of trial printing, according to a trial printing operation of the operator 31, the trial printing execution processing unit 15 receives the submitted manuscript data 21 and the trial printing condition information 23 and transmits printing data (below-described printing data A1) generated from the trial printing condition information 23 and the submitted manuscript data 21 are transmitted to the printing data management unit 16.

In other words, the normal printing execution processing unit 12 performs printing control according to the normal printing condition information 22 on the printing apparatus 30 via the printing data management unit 16. Moreover, the trial printing execution processing unit 15 performs printing control according to the trial printing condition information 23 on the printing apparatus 30 via the printing data management unit 16.

It is assumed that the printing apparatus 30 to be set is the same between the trial printing condition information 33 and the normal printing condition information 22 that correspond to the same submitted manuscript data 21. The respective information sets such as the printing apparatus 30 that are included in the normal printing condition information 22 and the trial printing condition information 23 may be changed by a request of the operator 31.

In the printing control apparatus 10, if the operator 31 performs the trial printing operation, the trial printing condition information 23, not the normal printing condition information 22, is obtained as a printing condition, and printing control in accordance with the printing condition is performed on the printing apparatus 30. In this way, the printing control apparatus 10 may easily perform trial printing under the printing condition different from that for normal printing.

Moreover, the trial printing condition associating unit 17 associates the submitted manuscript data 21 and the trial printing condition information 23. The trial printing execution processing unit 15 may easily obtain the trial printing condition information 23 associated with the submitted manuscript data 21. The trial printing execution processing unit 15 performs printing control according to the trial printing condition information 23 associated with the submitted manuscript data 21 on the printing apparatus 30 via the printing data management unit 16. Therefore, the operator 31 may simply perform the trial printing operation of the submitted manuscript data 21 to obtain results of trial printing (printing deliverables) that correspond to the trial printing condition information 23.

Furthermore, the trial printing condition associating unit 17 includes the association automating unit 18. The association automating unit 18 automatically associates the submitted manuscript data 21 and the trial printing condition information 23. In this way, in the printing control apparatus 10, at the time the submitted manuscript data 21 are submitted, associating with the trial printing condition information 23 is automatically performed, making it possible to also reduce operational errors such as the operator 31 making a wrong setting of the trial condition information 23.

The printing data management unit 16 receives printing data from the normal printing execution processing unit 12 or the trial printing execution processing unit 15. The printing data management unit 16 receives printing data for normal printing from the normal printing execution processing unit 12. Moreover, the printing data management unit 16 receives printing data for trial printing from the trial printing execution processing unit 15. The printing data management unit 16 manages an order of outputting of received printing data to the printing apparatus 30. Details of management of the order of the outputting of the printing data by the printing data management unit 16 will be described below.

If trial printing and normal printing are performed on the same submitted manuscript data 21, the printing data management unit 16 manages the order of outputting the printing data by the printing queue 20, so it is ensured that normal printing of the same submitted manuscript data 21 is not performed in advance of the trial printing. Printing data of the normal printing and the trial printing of the same manuscript data 21 may be identified by using, for example, a printing data name, etc.

(Hardware Configuration of Printing Control Apparatus)

Figure 3:
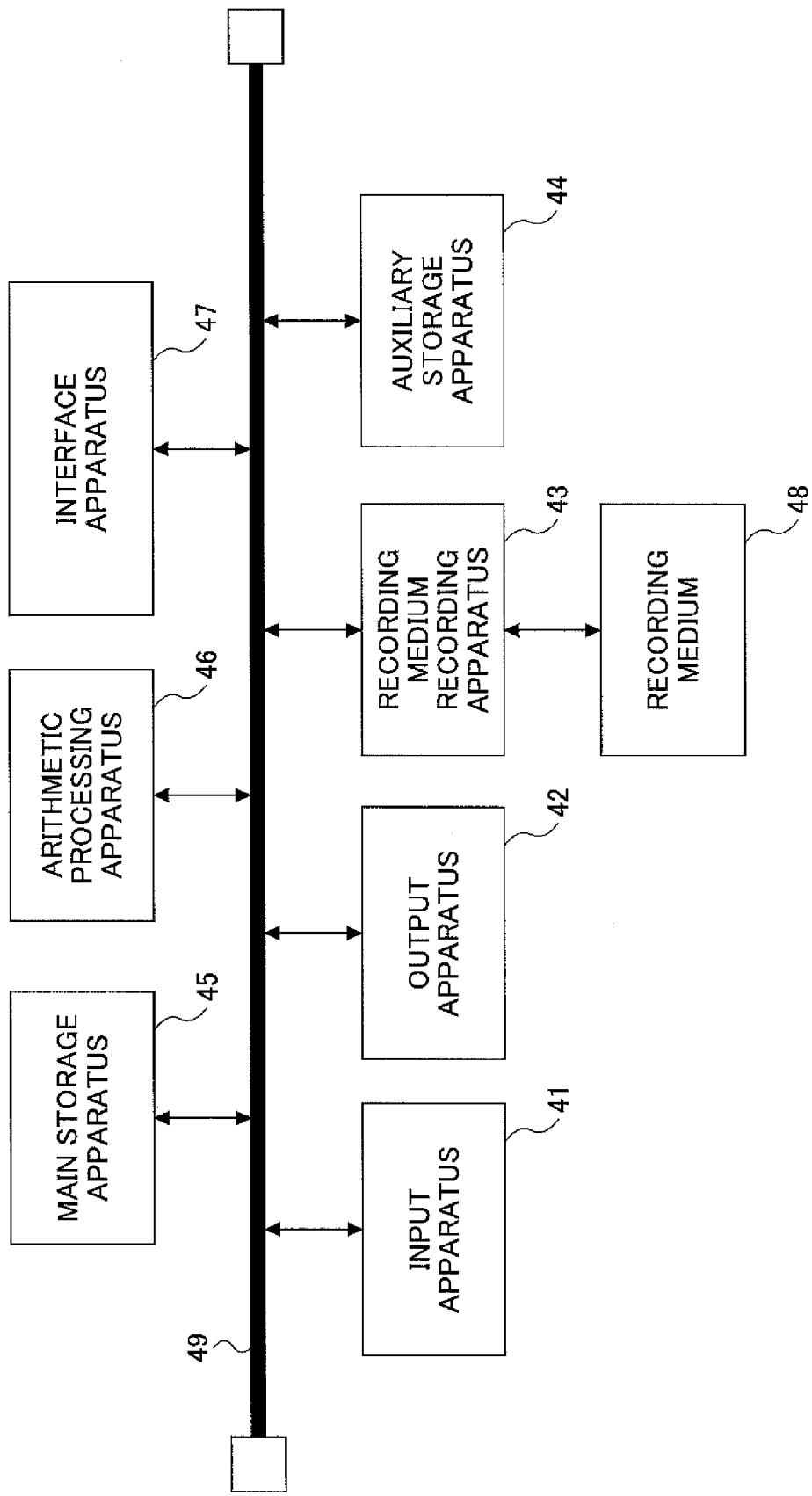
FIG. 3 is a hardware configuration diagram of an exemplary PC.

The printing control system 10 in FIG. 2 is realized with a PC with a hardware configuration such as shown in FIG. 3, for example. FIG. 3 is a hardware configuration diagram of an exemplary PC. A PC 40 includes an input apparatus 41, an output apparatus 42, a recording medium reading apparatus 43, an auxiliary storage apparatus 44, a main storage apparatus 45, an arithmetic processing apparatus 46, and an interface apparatus 47 that are mutually connected via a bus 49.

The input apparatus 41 includes a keyboard, a mouse, etc. The input apparatus 41 is used for inputting various signals. The output apparatus 42 includes a display apparatus, etc. The output apparatus 42 is used for displaying various windows, data, etc. The interface apparatus 47 includes a modem, a LAN card, etc. The interface apparatus 47 is used for connecting to networks such as the Internet, a LAN, etc.

A non-transitory printing management program product installed in the printing control apparatus 10 is at least a part of various program products which control the PC 40. The printing control program product is provided by distributing the recording medium 48, downloading from the network, etc., for example.

For the recording medium 48, various types of recording media may be used such as a recording medium which optically, electrically, or magnetically records information such as a CD-ROM, a flexible disk, a magneto-optical disk, etc.; and a semiconductor memory which electrically records information such as a ROM, a flash memory, etc.

When the recording medium 48 having recorded the printing control program product therein is set to the recording medium reading apparatus 43, the printing control program product is installed from the recording medium 48 to the auxiliary storage apparatus 44 via the recording medium reading apparatus 43. The printing control program product which is downloaded from the network, etc., is installed in the auxiliary storage apparatus 44 via the interface apparatus 47.

The auxiliary storage apparatus 44 stores the printing control program product, a required file, data, etc. The main storage apparatus 45 reads the printing control program product from the auxiliary storage apparatus 44 at the time of launching the printing control program product. Then, the arithmetic processing apparatus 46 implements various processes according to the printing control program product stored in the main storage apparatus 45.

(Another Example of Printing System)

Figure 4:
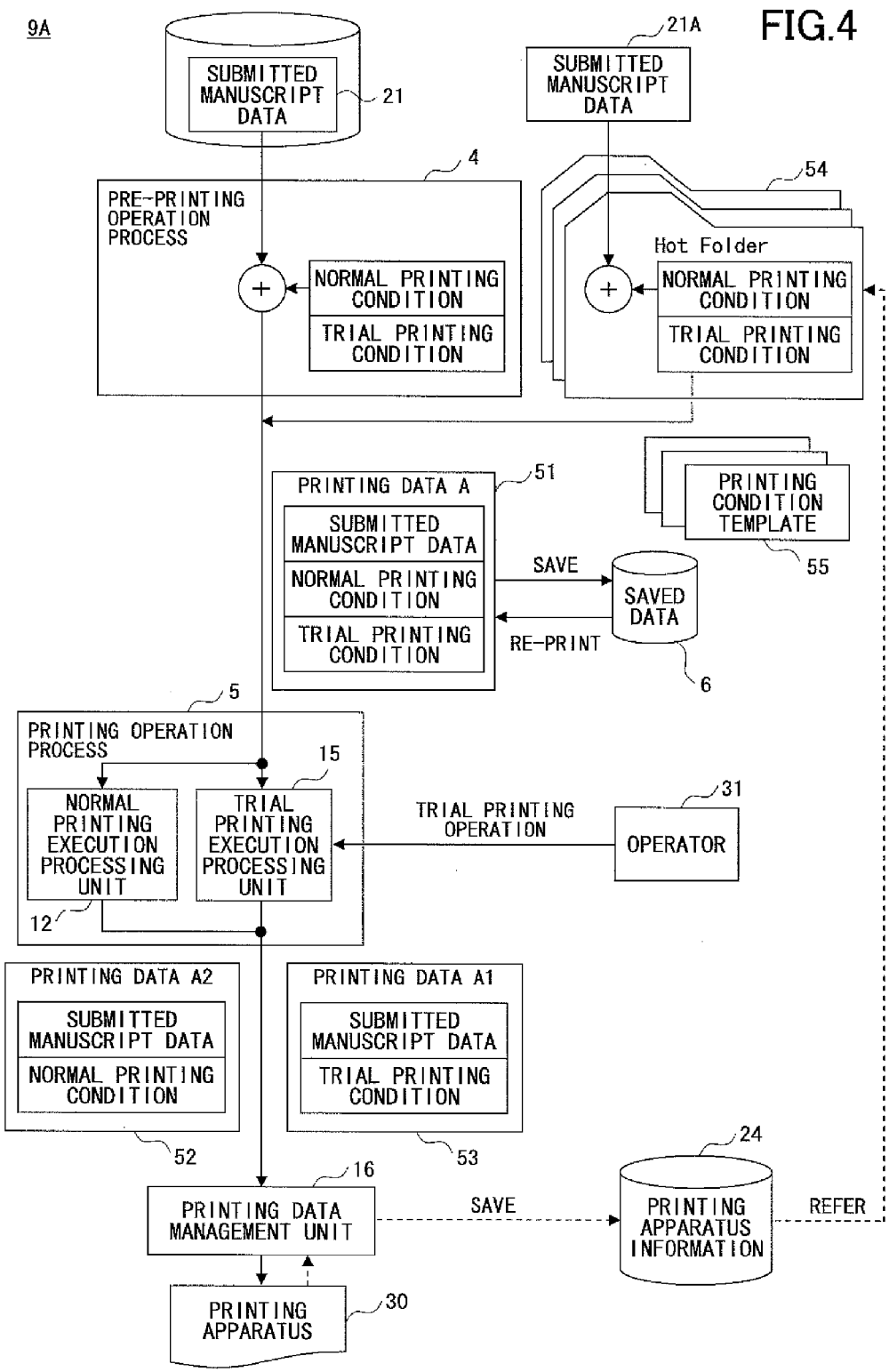
FIG. 4 is a configuration diagram of an example of another exemplary printing system according to the present embodiment.

FIG. 4 is an explanatory diagram of an example of another exemplary printing system according to the present embodiment. In the prepress operation process 4, normal printing and trial printing conditions are set for the submitted manuscript data 21. In the present embodiment, there is no specific implementation required for the prepress operation process 4. The prepress operation process 4 may operate on the PC 40 as an application program product or may be installed as a function within the printing apparatus 30. Moreover, the prepress operation process 4 may be operated in a computer called a digital front-end (below-called a DFE) server, which is often used for the printing apparatus 30 for a POD operation.

A file format for the submitted manuscript data 21 is generally PDF data, for example, for electronic manuscript submission. However, in the present embodiment, there is no specific requirement for the file format. The file format for the submitted manuscript data 21 may be data for a general application program product, including word processing software such as Word (registered trademark) or spreadsheet software such as Excel (registered trademark). Moreover, for paper manuscript submission, the file format for the submitted manuscript data 21 may be image data read with a scanner.

In the prepress operation process 4, normal printing and trial printing conditions are set for the submitted manuscript data 21. Setting of the normal printing and trial printing conditions are performed with reference to printing apparatus location information 24 which indicates capabilities of the printing apparatus 30, including post-processing functions such as stapling, punching, mono-chrome/color printing, and the sheet size of the paper-supplying tray.

The set normal printing and trial printing conditions are sent, with the submitted manuscript data, as printing data (printing data A) to the printing operation process 5. In the printing operation process 5, according to a printing instruction from the operator 31, the printing data A are converted to printing data 52 (printing data A2) or printing data 53 (printing data A1), which can be interpreted by the printing apparatus 30, after which the converted results are transmitted to the printing data management unit 16.

In a manner similar to the prepress operation process 4, no specific implementation of the printing operation process 5 is required in the present embodiment. The printing operation process 5 may operate on the PC 40 as an application program product or may be installed as a function within the printing apparatus 30 or on a DFE server.

In the printing operation process 5, either one of the normal printing operation and the trial printing operation is selected by the operator 31. In the printing operation process 5, when the trial printing operation is selected, the printing data A are converted to the printing data A1, after which the converted results are transmitted to the printing data management unit 16. In the printing operation process 5, when the normal printing operation is selected, the printing data A are converted to the printing data A2, after which the converted results are transmitted to the printing data management unit 16.

The trial printing condition may include, for example, whether or not the special paper is used, setting of the paper-supplying tray, setting of the printing apparatus 30, setting of a post-processing function of the printing apparatus 30, etc. Besides, as long as the trial printing condition may be associated with the submitted manuscript data 21, it is clear that any setting may be included therein. The present embodiment demonstrates more advantages when the trial printing condition needs to have the setting thereof changed in accordance with the submitted manuscript data 21 or the customer who submitted the manuscript relative to when it is to be changed in accordance with sheet medium to be used or the printing apparatus 30.

In the POD operation, requests take place as trial printing such as "one set of printed matter with the same appearance as the final deliverable using special paper for the whole set is needed" and "cost needs to be contained, without using the special paper". These requests normally differ among the submitted manuscript data sets 21 which are submitted to the printing system 9A, and do not differ according to the printing apparatus 30 or the sheet medium used.

For example, with respect to the submitted manuscript data 21 for re-printing that have been ordered by the customer repeatedly and that have been printed the number of times already, a likelihood that there is an error in the printing condition is low, so that a likelihood that using special paper for the whole printing ends up becoming wasted is low. On the other hand, with respect to submitted manuscript data 21 for newly submitted manuscripts, likelihood is high that there is an error in the printing condition, and there remains a likelihood of having to re-print a number of times, so there is a high likelihood that printing using expensive special paper causes the printing to become wasted.

In this way, the trial printing condition is changed in accordance with whether the submitted manuscript data 21 is for new printing or re-printing, or whether the sample confirmation is necessary through contracting with the customer, etc. In particular, the operator 31 does not have to worry about the trial printing condition, so it suffices to provide a trial printing operation (a printing instruction for trial printing) with respect to the printing operation process 5.

In the printing system 9A in FIG. 4, associating among the submitted manuscript data 21 and the normal printing and trial printing conditions is implemented by collectively handling the submitted manuscript data 21 and the normal printing and trial printing conditions as the printing data A.

Various specific file formats for the printing data A are possible; for example, they may be provided in one file with compression and archiving formats such as ZIP, LHA, etc., for example, or the associating may be expressed in a link using formats such as HTML, XML, etc.

Moreover, in the printing system 9A in FIG. 4, job definition formats such as JDF, etc., can generally be used to define a normal printing condition for the submitted manuscript data 21. The JDF, which follows an XML format, allows extending of individual definitions. Thus, for the trial printing condition, the JDF may be internally extended or added.

The printing data A, which represent a collection of the submitted manuscript data 21, normal printing and trial printing conditions, may also be used at the time of re-printing if they are saved as saved data 6. Moreover, if the normal printing and trial printing conditions are provided in advance as a printing condition template 55, the normal printing and trial printing conditions may easily be set with the prepress operation process 4 in the printing system 9A in FIG. 4.

In the present embodiment, no specific format for the printing data A1 and A2 is required as it depends on the specification of the printing apparatus 30 which actually performs printing. In general, the submitted manuscript data portion of the printing data A1 and A2 is converted to PDL (page description language) of the printing apparatus 30. Moreover, the trial printing condition or the normal printing condition (the printing setting portion) of the printing data A1 and A2 is converted to a job description language such as PJL, etc.

Furthermore, if the printing apparatus 30 supports the JDF, for example, the conversion process in the printing operation process 5 is not needed if the trial printing condition or normal printing condition of the printed data A1 and A2 is described in JDF. Moreover, for the printing data A1 and A2, the printing data management unit 16 manages an order of outputting (an order of printing), etc. Moreover, the printing data A are not limited to the printing operation process 5, so that they may be converted to the printing data A1 or A2 by the printing data management unit 16.

Moreover, in the printing system 9A in FIG. 4, an existing Hot Folder 54 is used as an example of a unit which automatically associates the submitted data 21A, the normal printing and trial printing conditions.

The Hot Folder 54 is a folder for monitoring incoming data. The Hot Folder 54 may define how the submitted manuscript data 21A are processed. If an association with the printing condition template 55 for the normal printing and trial printing conditions is defined once in the Hot Folder 54, the operator 31 may only submit the submitted manuscript data 21A to the Hot Folder 54 to automatically perform associating with the normal printing and the trial printing conditions. Therefore, the printing system 9A makes it possible to reduce operational errors such as the operator 31 making a wrong setting of the normal printing condition or the trial printing condition.

Moreover, the hot folder 54 may be provided in multiple numbers to change settings for the respective hot folders 54. For example, for electronic manuscript submission via the Internet, the hot folder 54, to which the submitted manuscript data 21A are transferred, may be divided for each operation and for each customer for the printing system 9A to automatically perform an optimal trial printing setting for each operation and for each customer. The hot folder 54 may be replaced with, for example, a mechanism with similar incoming monitoring.

(Processing Procedure of Printing Data Management Unit)

Figure 5:
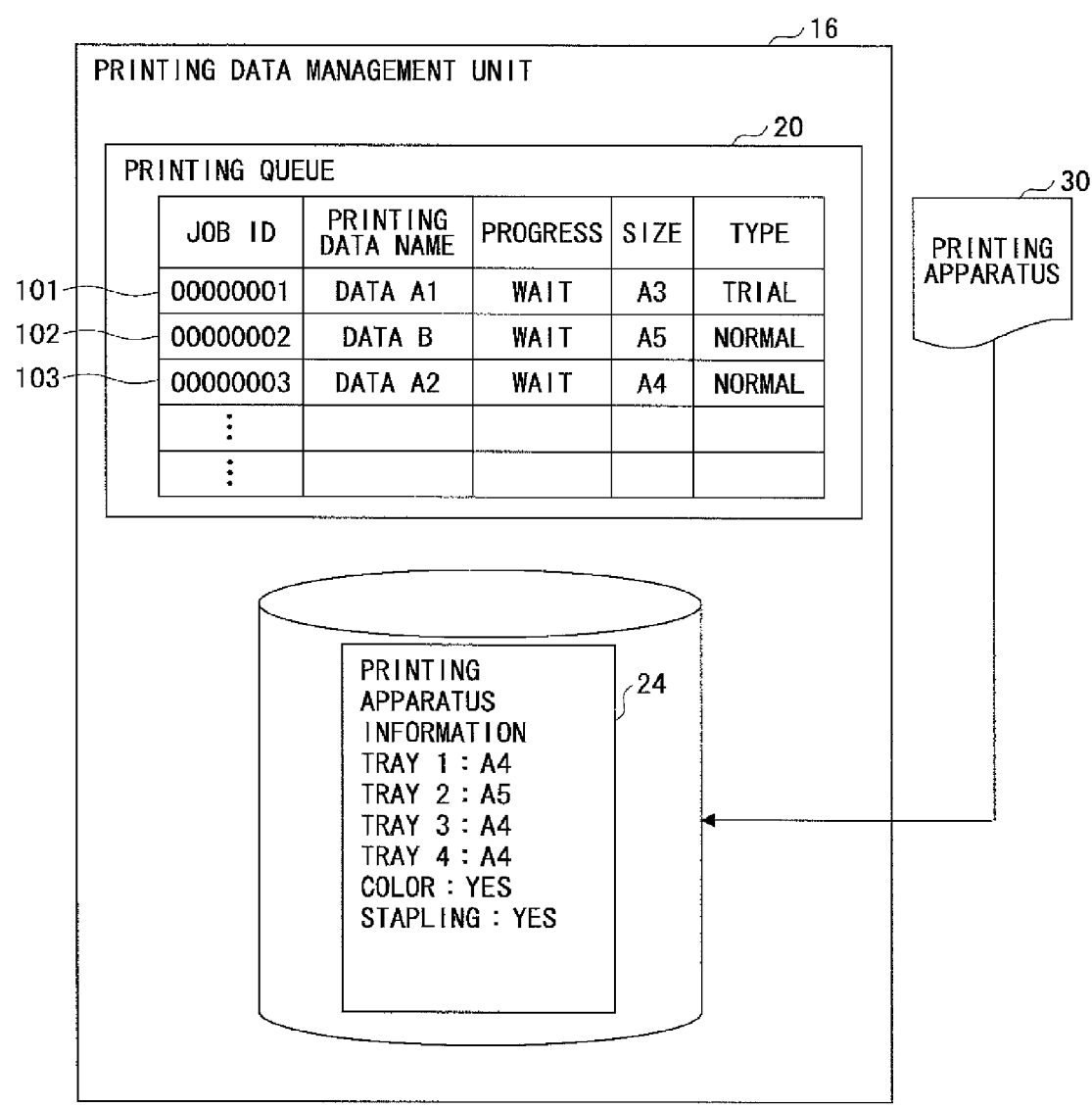
FIG. 5 is an overall diagram of an example of management of a printing queue by a printing data management unit.

FIG. 5 is an overall diagram of an example of management of a printing queue by a printing data management unit. A printing data management unit 16 has a printing queue 20 for the respective printing apparatuses 30. In correspondence with the printing data, the printing queue 20 holds information such as a job ID, a printing data name, progress, size, type, etc. Normally, the printing queue 20 successively transmits printing data to the printing apparatus 30 and causes the printing apparatus 30 to print the printing data.

In order to effectively utilize the printing apparatus 30, the printing queue 20 may cause printing data of a sheet size installed in the printing apparatus 30 to be preferentially transmitted to the printing apparatus 30 for printing. In an example of the printing apparatus information 24 in FIG. 5, only a sheet size of A4 or A5 is installed in the printing apparatus 30.

The printing data 101 with the printing data name "data A1" have a sheet size to be used of A3, so that printing is not performed unless sheet replacement is performed. Moreover, the printing data 102 with the printing data name "data B" have a sheet size to be used of A5, so that printing is performed. Furthermore, the printing data 103 with the printing data name "data A2" have a sheet size to be used of A4, so that printing is performed.

In other words, in the example of the printing queue 20 in FIG. 5, after the printing data 102 of the printing data name "data B" are printed, the printing data 103 with the printing data name "data A2" are printed. After the sheet replacement in which a sheet size of A3 is installed in the printing apparatus 30 is performed, the printing data 101 of the printing data name "data A1" are printed.

Now, it does not make sense to perform trial printing unless the trial printing is always carried out prior to the normal printing. As the printing data 101 with the printing data name "data A1" represent trial printing of the printing data 103 with the printing data name "data A2", the effectiveness of the trial printing is reduced unless they are printed before the printing data 103 for the normal printing. The printing data management unit 16 of the present embodiment is provided with a mechanism for preventing unreasonable passing of the printing data 101 for the trial printing by the printing data 103 for the normal printing.

Figure 6:
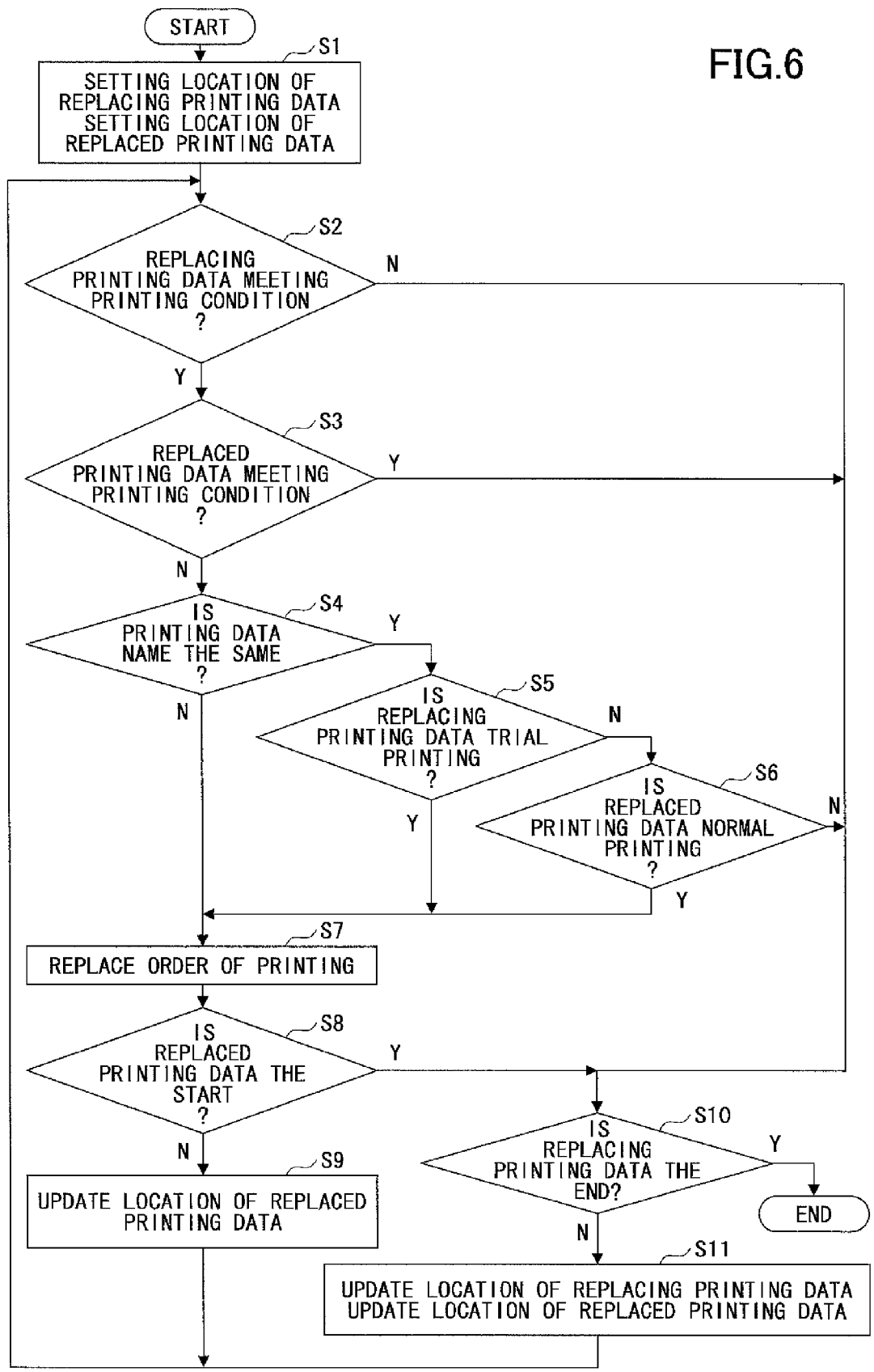
FIG. 6 is a flowchart showing an example of a processing procedure which prevents unreasonable passing of printing data of trial printing by printing data of normal printing.

FIG. 6 is a flowchart showing an example of a processing procedure which prevents unreasonable passing of printing data for trial printing by printing data for normal printing.

Replacing printing data, which are shown in the flowchart in FIG. 6, are printing data subsequent to replaced printing data in the printing queue 20 and are printing data to change an order of printing with respect to the replaced printing data. Moreover, the replaced printing data are printing data preceding the replacing printing data in the printing queue 20 and are printing data to change the order of printing with the replacing printing data.

For example, for the printing queue 20 in FIG. 5, a relationship between the printing data 101 with the printing data name "data A1" and the printing data 102 with the printing data name "data B" is that the printing data 101 becomes the replaced printing data and the printing data 102 becomes the replacing printing data.

In step S1, the printing data management unit 16 sets a location of the replacing printing data and a location of the replaced printing data. For example, for the printing queue 20 in FIG. 5, the printing data 102 with the printing data name "data B" is set as a location of the replacing printing data and the printing data 101 of the printing data name "data A1" is set as a location of the replaced printing data.

In step S2, the printing data management unit 16 determines whether the replacing printing data meet the printing condition. If the replacing printing data do not meet the printing condition, there is no need to change an order of printing of the replacing printing data with the replaced printing data, and the process proceeds to step S10.

For the printing queue 20 in FIG. 5, the printing data management unit 16 determines that the printing data 102 which are the replacing printing data meet the printing condition. If the replacing printing data meet the printing condition, the printing data management unit 16 determines whether the replaced printing data meet the printing condition in step S3.

If the replaced printing data meet the printing condition, there is no need to change an order of printing of the replacing printing data with the replaced printing data, and the process proceeds to step S10. For the printing queue 20 in FIG. 5, the printing data management unit 16 determines that the printing data 101 which are the replaced printing data do not meet the printing condition. If the replaced printing data do not meet the printing condition, the printing data management unit 16 compares the printing data names of the replacing printing data and the replaced printing data in step S4.

If the printing data names of the replacing printing data and the replaced printing data are not the same, the printing data management unit 16 changes the printing order of the replacing printing data and the replaced printing data in step S7. For the printing queue 20 in FIG. 5, the printing data management unit 16 switches between the printing data 101 and 102.

Determining whether the printing data names of the replacing printing data and the replaced printing data are the same is an example of determining whether the printing data sets are printing data sets corresponding to the same submitted manuscript data 21. For the printing queue 20 in FIG. 5, a printing data name "data A1" and a printing data name "data A2" may be determined to be the same by ignoring the numerical portion thereof.

If the printing data names of the replacing printing data and the replaced printing data are the same in step S4, the printing data management unit 16 determines whether the type of the replacing printing data represents trial printing in step S5. If the type of the replacing printing data represents the trial printing, the printing data management unit 16 changes the order of printing between the replacing printing data and the replaced printing data in step S7. Moreover, if the type of the replacing printing data does not represent the trial printing, the printing data management unit 16 determines whether the type of the replaced printing data represents normal printing in step S6.

If the type of the replaced printing data represents the normal printing, the type of the replacing printing data and the type of the replaced printing data are both the normal printing, so that the printing data management unit 16 changes the order of printing between the replacing printing data and the replaced printing data in step S7. Moreover, if the type of the replaced printing data does not represent the normal printing, in order to prevent unreasonable passing of the printing data for the trial printing by the printing data for the normal printing that correspond to the same submitted manuscript data 21, the switching between the replacing printing data and the replaced printing data is not performed, so that the process proceeds to step S10.

After the process in step S7, the printing data management unit 16 determines whether the replaced printing data represent the start. If the replaced printing data represent the start, the printing data management unit 16 proceeds to the process of step S10.

If the replaced printing data do not represent the start, the printing data management unit 16 updates the location of the replaced printing data in step S9 and returns to the process of step S2. Moreover, the printing data management unit 16 determines whether the replacing printing data represent the end in step S10. If the replacing printing data do not represent the end, the printing data management unit 16 updates the locations of the replaced printing data and the replacing printing data in step S11 and returns to the process in step S2.

For the printing queue 20 in FIG. 5, the printing data management unit 16 updates the location of the replacing printing data to the printing data 103 of the printing data name "data A2" and updates the location of the replaced printing data to the printing data 101 of the printing data name "data A1".

Figure 7:
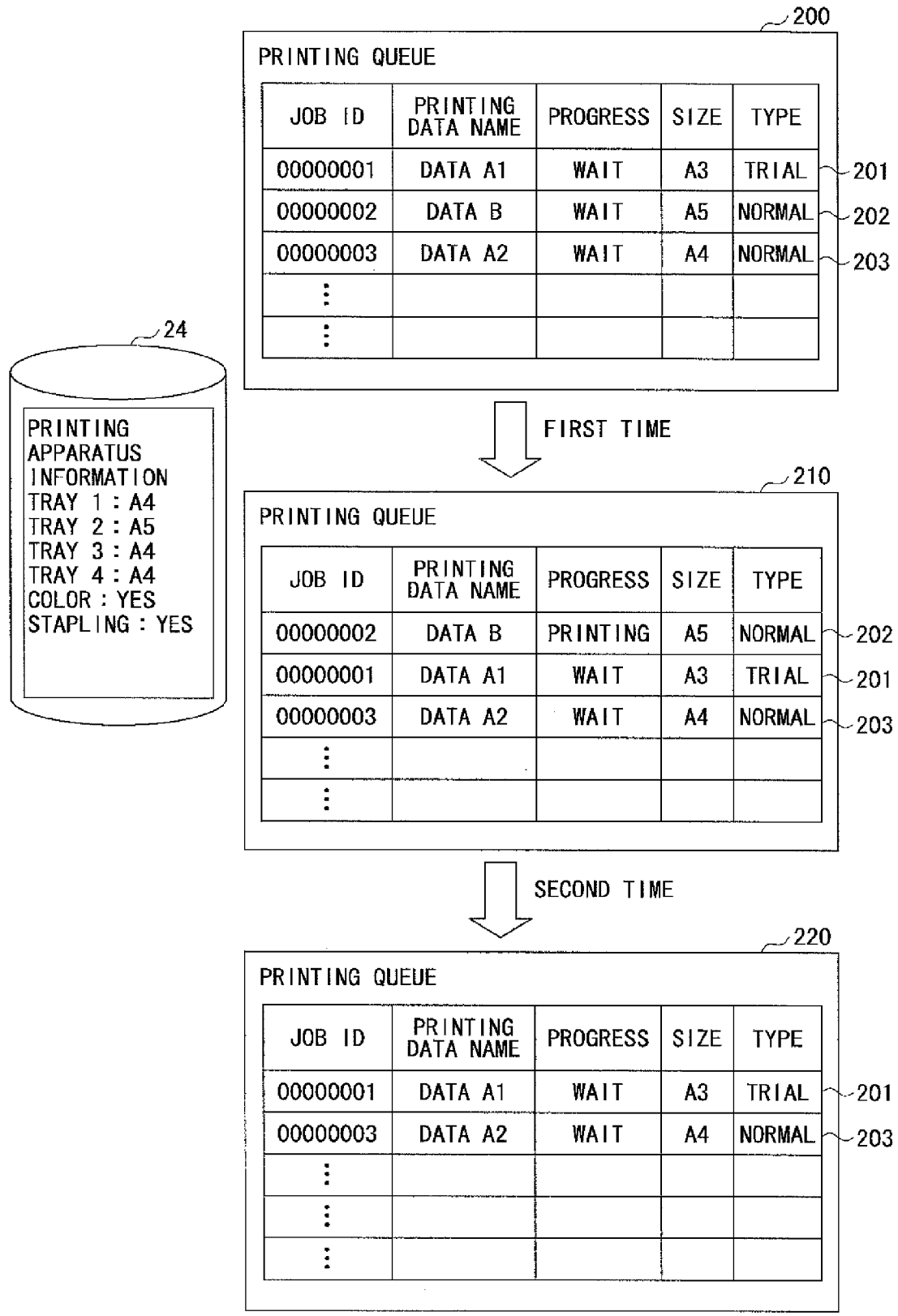
FIG. 7 is a diagram explaining one example showing a state transition of the printing queue.

FIG. 7 is a diagram explaining one example showing state transition of the printing queue. The printing queue 200 in FIG. 7 is the same as the printing queue 20 in FIG. 5. For the printing apparatus information 24 in FIG. 7, the printing data 201 with the printing data name "data A1" has the sheet size A3 matching none of sheet sizes A4 and A5 installed in a tray of the printing apparatus 30, so that printing is put on hold.

Then, the printing data management unit 1 changes the order of printing of subsequent printing data having the sheet size matching the sheet size A4 and A5 installed in the tray of the printing apparatus 30 to an earlier one to cause the printing apparatus 30 to print the subsequent printing data. Once the process of the flowchart in FIG. 6 is executed once, as the printing data names of the printing data 202 with the printing data name "data B" and the printing data 201 with the printing data name "data A1" do not match, the printing data 202 is replaced by the printing data 201, so that the printing order of the printing data 202 becomes the start as shown in the printing queue 210. Then, after the printing data 202 are printed by the printing apparatus 30, they are deleted from the printing queue 210.

Moreover, in the second execution of the process of the flowchart in FIG. 6, as the printing data 203 with the printing data name "data A2" have the printing data 201 with the printing data name "data A1" as the replaced printing data, the data sets have the same printing data name, and the trial printing is executed earlier, no replacement of the order of printing with the printing data 201 occurs, so that the printing data 203 remain to be located after the printing data 201. It is desirable that the printing apparatus information 24 is updated periodically, or is updated when there is a change in the capabilities of the printing apparatus 30.

(Summary)

According to the present embodiment, the printing data 53 for the trial printing and the printing data 52 for the normal printing may be apportioned to the same printing apparatus 30 for printing. Moreover, the present embodiment makes it possible to provide a printing control function which ensures that the printing data 53 for the trial printing is caused to be printed earlier than the printing data 52 for the normal printing by the printing apparatus 30 when the printing data 53 of the trial printing and the printing data 52 of the normal printing of the submitted manuscript data 21 are simultaneously registered in the printing queue 20.

Besides, according to the present embodiment, the trial printing condition may be set separately from the normal printing condition, making it possible to provide a trial printing function which meets the demands of the customer. Moreover, according to the present embodiment, a trial printing condition may be replaced automatically according to the submitted manuscript data 21, making it possible to provide a trial printing function which is easy to use. Furthermore, according to the present embodiment, association of the submitted manuscript data 21 and the trial printing condition may be automated, making it possible to provide a trial printing function with few operational errors.

The present embodiment makes it possible to improve the ease of use of the trial printing function which performs trial printing of the submitted manuscript data 21 which are submitted to the printing system 9.

The present invention is not limited to the specific embodiments disclosed, so that variations and changes are possible without departing from the claims.

The present application is based on Japanese Priority Application No. 2011-134046 filed on Jun. 16, 2011, the entire contents of which are hereby incorporated by reference.

The invention claimed is:

1. A non-transitory computer readable medium comprising a printing control program product which causes a computer to function as:
   a printing data generating unit configured to generate normal printing data for normal printing and trial printing data for trial printing such that the normal printing data for the normal printing and the trial printing data for the trial printing are printed by the same printing apparatus, the normal printing data and the trial printing data being generated from the same submitted manuscript data, the normal printing data having set a normal printing condition, the normal printing data including normal manuscript data based on the submitted manuscript data, the trial printing data having set a trial printing condition, the trial printing data including trial manuscript data based on the submitted manuscript data, the normal manuscript data and the trial manuscript data being different; and
   a printing data management unit configured to,
   receive the printing data for the normal printing and the printing data for the trial printing,
   extract, from the normal printing data and the trial printing data, the normal printing condition, the trial printing condition, a normal manuscript name from the normal manuscript data, and a trial manuscript name from the trial manuscript data,
   determine whether the normal printing condition matches the trial printing condition,
   instruct the same printing apparatus to print the normal printing data and the trial printing data in accordance with the normal printing condition and the trial printing condition, respectively, when the normal printing condition matches the trial printing condition,
   compare the normal manuscript name with the trial manuscript name when the normal printing condition does not match the trial printing condition, and
   change a print order when the normal manuscript name and the trial manuscript name do not match.

2. The non-transitory computer readable medium of claim 1, wherein the printing data generating unit is configured to set the normal printing condition and the trial printing condition such that type information indicating either of the printing data for the normal printing and the printing data for the trial printing is included therein.

3. The non-transitory computer readable medium of claim 2, wherein the printing data generating unit includes:
   a printing condition information setting unit configured to generate the normal printing data in which the normal printing condition is set and the trial printing data in which the trial printing condition is set;
   a normal printing execution processing unit configured to generate the normal printing data for the normal printing in which printing data for the normal printing condition is set from the printing data in which both the normal printing condition and the trial printing condition are set; and
   a trial printing execution processing unit configured to generate the trial printing data for the trial printing in which printing data for the trial printing condition is set from the printing data in which both the normal printing condition and the trial printing condition are set.

4. The non-transitory computer readable medium of claim 2, wherein the printing data management unit has a printing queue, and is configured to manage a replacement of an order of printing between the normal printing data for the normal printing and the trial printing data for the trial printing such that the normal printing data for the normal printing is prevented from being printed prior to the trial printing data for the trial printing when the normal printing data for the normal printing and the trial printing data for the trial printing that are generated from the same submitted manuscript data are registered in the printing queue.

5. A printing control apparatus, comprising:
a printing data generating unit configured to generate normal printing data for normal printing and trial printing data for trial printing such that the normal printing data for the normal printing and the trial printing data for the trial printing are printed by the same printing apparatus, the normal printing data and the trial printing data being generated from the same submitted manuscript data, the normal printing data having set a normal printing condition, the normal printing data including normal manuscript data based on the submitted manuscript data, the trial printing data having set a trial printing condition, the trial printing data including trial manuscript data based on the submitted manuscript data, the normal manuscript data and the trial manuscript data being different; and
a printing data management unit configured to,
receive the printing data for the normal printing and the printing data for the trial printing, extract, from the normal printing data and the trial printing data, the normal printing condition, the trial printing condition, a normal manuscript name from the normal manuscript data, and a trial manuscript name from the trial manuscript data,
determine whether the normal printing condition matches the trial printing condition,
instruct the same printing apparatus to print the normal printing data and the trial printing data in accordance with the normal printing condition and the trial printing condition, respectively, when the normal printing condition matches the trial printing condition,
compare the normal manuscript name with the trial manuscript name when the normal printing condition does not match the trial printing condition, and change a print order when the normal manuscript name and the trial manuscript name do not match.

6. A printing system, comprising:
the non-transitory computer readable medium as claimed in claim 1 that is executable by the computer; and
an image forming apparatus.

7. The non-transitory computer readable medium of claim 1, wherein the printing data management unit has a printing queue, and is configured to manage a replacement of an order of printing between the normal printing data for the normal printing and the trial printing data for the trial printing such that the normal printing data for the normal printing is prevented from being printed prior to the trial printing data for the trial printing when the normal printing data for the normal printing and the trial printing data for the trial printing that are generated from the same submitted manuscript data are registered in the printing queue.

8. The printing control apparatus of claim 5, wherein the printing data management unit has a printing queue, and is configured to manage a replacement of an order of printing between the normal printing data for the normal printing and the trial printing data for the trial printing such that the normal printing data for the normal printing is prevented from being printed prior to the trial printing data for the trial printing when the normal printing data for the normal printing and the trial printing data for the trial printing that are generated from the same submitted manuscript data are registered in the printing queue.

9. The printing control apparatus of claim 5, wherein the printing data generating unit is configured to set the normal printing condition and the trial printing condition such that type information indicating either of the printing data for the normal printing and the printing data for the trial printing is included therein.

10. The printing control apparatus of claim 9, wherein the printing data management unit has a printing queue, and is configured to manage a replacement of an order of printing between the normal printing data for the normal printing and the trial printing data for the trial printing such that the normal printing data for the normal printing is prevented from being printed prior to the trial printing data for the trial printing when the normal printing data for the normal printing and the trial printing data for the trial printing that are generated from the same submitted manuscript data are registered in the printing queue.

* * * * *